(12) United States Patent
Watts

(10) Patent No.: US 6,647,449 B1
(45) Date of Patent: Nov. 11, 2003

(54) SYSTEM, METHOD AND CIRCUIT FOR PERFORMING ROUND ROBIN ARBITRATION

(75) Inventor: Jonathan Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 496 days.

(21) Appl. No.: 09/680,551

(22) Filed: Oct. 5, 2000

(51) Int. Cl.⁷ .......................... G06F 13/00; G06F 13/14
(52) U.S. Cl. ........................................ 710/111; 710/240
(58) Field of Search .................. 710/111, 107, 710/113–114, 240–241

(56) References Cited

U.S. PATENT DOCUMENTS 5,095,460 A * 3/1992 Rodeheffer ............... 709/103
5,568,485 A * 10/1996 Chaisemartin ............. 370/462

OTHER PUBLICATIONS

"Positional Bus Arbitration Scheme", IBM Technical Disclosure Bulletin, vol. 34, Issue No. 10A, pp. 20–24, Mar. 1, 1992.*

* cited by examiner

Primary Examiner—Glenn A. Auve
Assistant Examiner—Trisha Vu

(57) ABSTRACT

A method, system and circuit for performing a round robin arbitration, which includes an input operable to receive a plurality of requests, a conditional request masking logic to selectively send the plurality of requests to a priority encoder, a priority encoder to output a request from the selected plurality of requests from the conditional request masking logic for servicing, and a storage element to store the most recently serviced request. Wherein the conditional request masking logic sends any request from the plurality of requests that has a lower priority according to said priority encoder than the most recently serviced request if such a request exists, otherwise all requests are sent to the priority encoder.

6 Claims, 3 Drawing Sheets

| INPUT | OUTPUT |
|-------|--------|
| 0001 | 1110 |
| 0010 | 1100 |
| 0100 | 1000 |
| 1000 | 0000 |

SYSTEM, METHOD AND CIRCUIT FOR PERFORMING ROUND ROBIN ARBITRATION

The present invention generally relates to an improved system, method and circuit for performing round robin arbitration. More specifically, it relates to a round robin arbitration system, method and circuit that includes a conditional request masking logic.

Round robin arbitration is generally known and used in the art as a method for resolving contending requests for service access and data transfer over computer networks. It is very common for multiple resources to compete for access and control at any given cycle. As a result, a round robin arbitration circuit is used to arbitrate and determine which one of the resources should be selected. The round robin arbiter is a circuit having a scheduling algorithm, which fairly distributes access to the resources.

Turning to FIG. 1, an overall architectural view of the implementation for a prior round robin arbitration implementation is shown. It is well known in the art that round robin arbiters are generally built using two major elements, a barrel shifter 10 and a priority encoder 12. The barrel shifter is a hardware device that shifts or rotates a data word by any number of bits in a single operation. More specifically, the barrel shifter 10 generally shifts the bits of an input request vector 14 by a number of bit positions specified by the control input, wherein the barrel shifter wraps the bits shifted off one end of the request vector back into the other end. The input request vector contains multiple requests for that cycle, and each request is one bit on the vector. An input request vector with four requests looks like "1011".

The barrel shifter 10 is generally used to rotate the input request vector according to the most recently serviced request so that the next eligible request is in the first bit position and outputted to the priority encoder 12. After that step, the priority encoder 12 selects the first active request from the rotated vector to an adder 16 to combine the most recently serviced request with the result from the priority encoder 12, and the request selection 18 is outputted and stored in a storage element 20 as the new, most recently serviced request for the next cycle.

One problem with the prior method is that the round robin algorithm for selecting the next service request is implemented by a functional element, specifically the barrel shifter 10 and an adder 16. Because of the use of the barrel shifter 10 and the adder 16, the prior method is implemented with more logic gates as a result of the shifting of the bits in the input request vector. Consequently, a longer propagation delay is needed to process each cycle.

Accordingly, a primary object of the present invention is to provide an improved system and method for a round robin arbitration that has a shorter propagation delay while requiring fewer logic gates.

Another object of the present invention is to provide an improved system and method for a round robin arbitration that can be implemented with fewer hardware devices.

Yet another object of the present invention is to provide an improved system and method for a round robin arbitration that is very efficient.

A further object of the present invention is to provide an improved system and method for a round robin arbitration that can be implemented with lower costs.

Other objects, features and advantages will become apparent upon reading the detailed description set forth herein, in conjunction with the attached drawings.

BRIEF SUMMARY OF THE INVENTION

The present invention generally relates to an improved system, method, and circuit for a round robin arbitration. More specifically, it relates to a system, method and circuit for a round robin arbitration that includes a conditional request masking logic.

The present invention provides an improved system, method and circuit for a round robin arbitration, which includes an input operable to receive a plurality of requests, a conditional request masking logic to selectively send the plurality of requests to a priority encoder, a priority encoder to output a request from the selected plurality of requests from the conditional request masking logic for servicing, and a storage element to store the most recently serviced request. The conditional request masking logic sends any request from the plurality of requests that has a lower priority according to said priority encoder than the most recently serviced request if such a request exists, otherwise all requests are sent to the priority encoder.

DETAILED DESCRIPTION

Broadly stated, the present invention is directed to an improved system and method for a round robin arbitration. Using a conditional request masking logic that selectively masks a specific input request (or requests) from the priority encoder, the present invention can be implemented without a barrel shifter, resulting in fewer hardware devices. In addition, because the present invention can be implemented with fewer logic gates, the round robin arbitration algorithm is processed with a shorter propagation delay than the prior method. As a result, the present invention provides an improved round robin arbitration implementation that is more efficient and less costly.

Figure 1:
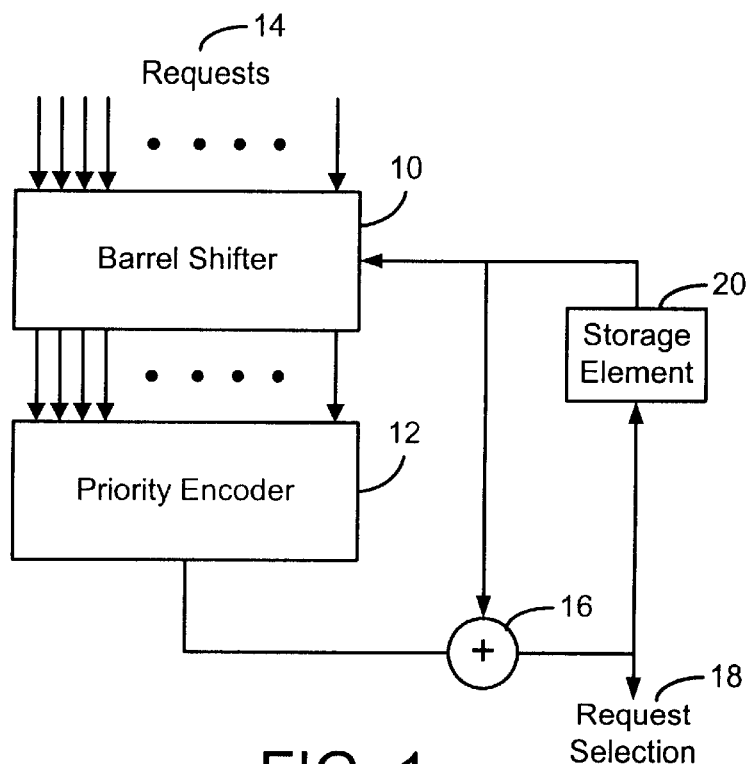
FIG. 1 is an overall architectural view of the implementation for a prior art round robin arbitration implementation.
Figure 2:
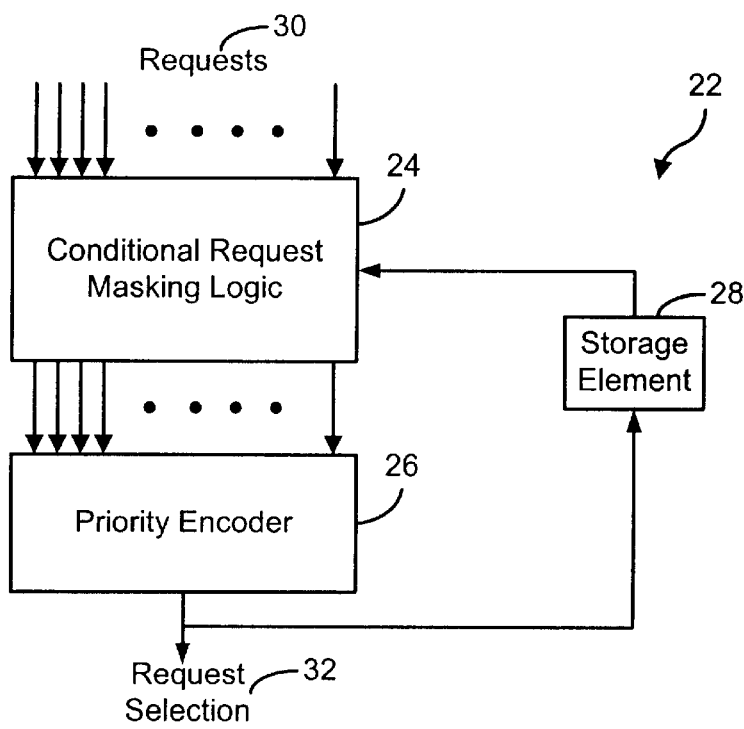
FIG. 2 is an overall architectural view of the implementation for the present invention.

Turning now to FIG. 2, an overall architectural view of the implementation for the present invention is shown and generally indicated as 22. The present invention has three major components: a conditional request masking logic 24, a priority encoder 26, and a storage element 28. A plurality of requests 30 are inputted into the conditional request masking logic 24, which selectively sends all or part of the requests to the priority encoder 26. More specifically, the conditional request masking logic 24 sends any request that has a lower priority than the most recently serviced request if such a request exists. Otherwise, it sends all the requests to the priority encoder 26. From the requests that are sent to the priority encoder 26, a highest priority request 32 is selected by the priority encoder for output to be serviced. The most recently serviced request is stored in the storage element 26 for the next cycle.

Figure 3:
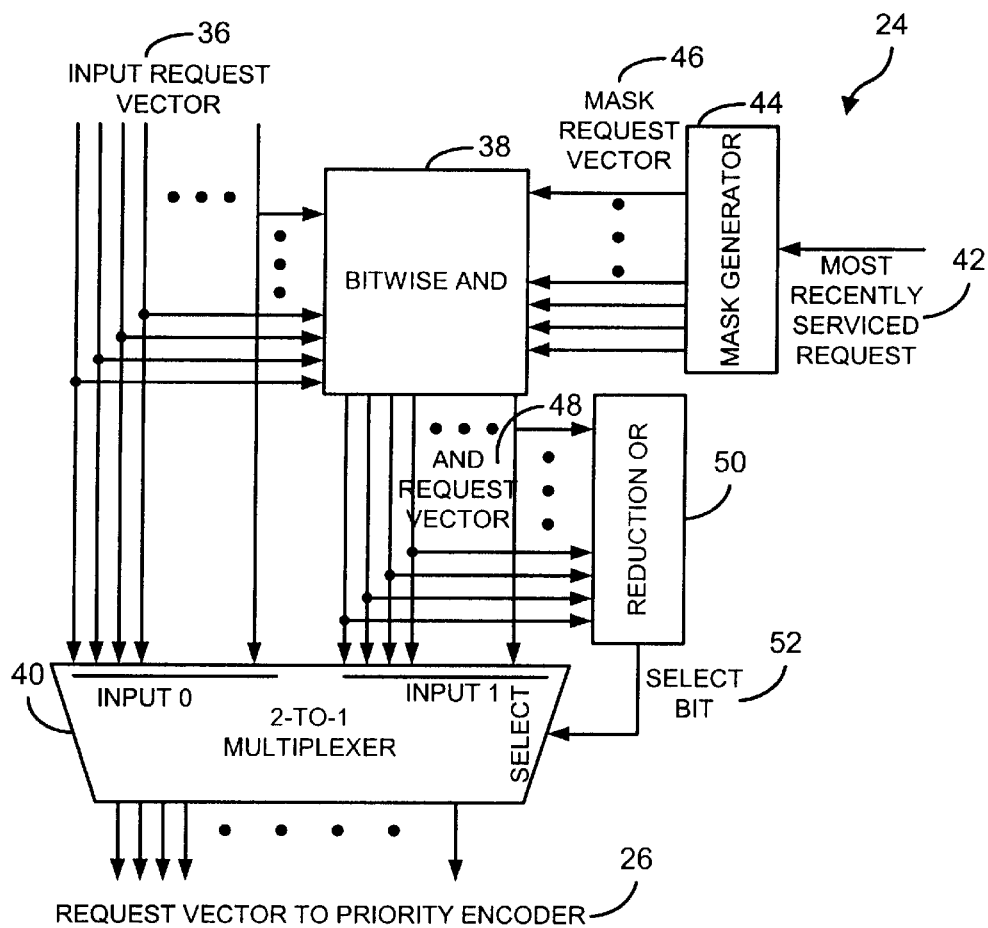
FIG. 3 is an exemplary schematic diagram of the conditional request masking logic shown in FIG. 2.

In FIG. 3, an exemplary schematic diagram of the conditional request masking logic 24 is shown. A request vector 36 is inputted into both a bitwise AND gate 38 and a multiplexer 40, and as previously explained, the request vector expresses multiple requests for one cycle wherein each request is designated by one bit. Although the present invention prefers the use of request vectors for its implementation, other implementations, such as an individual request, are contemplated and are within the scope of the present invention. On the other input of the bitwise AND gate 38, another vector is also inputted into the bitwise AND gate. More specifically, the most recently serviced request 42, which is stored in the storage element 28 (shown in FIG. 2), is sent to a mask generator 44.

The mask generator 44, in turn, sends a request mask vector 46 into the bitwise AND gate 38, and a "1" bit is outputted for each bit that has a lower priority than the most recently serviced request or a "0" bit for the bit(s) that has (have) the same or higher priority. The bitwise AND gate 38 performs an AND operation with the input request vector 36 and the request mask vector 46, and outputs an masked request vector 48, which outputs a true bit for each bit where both the input request vector and the request mask vector are true and a false bit otherwise.

The masked request vector is outputted to the multiplexer 40 and a reduction OR gate 50. As shown, the multiplexer 40 selects one of two vectors to the priority encoder 26, specifically the input request vector 36 and the masked request vector 48, and the selection is made based on a select bit 52 from the reduction OR gate 50. The reduction OR gate 50 will output a select bit that is a "1" bit if any of the bits in the masked request is also a "1" bit, otherwise a "0" bit is outputted. Then, the multiplexer 40 selects the masked request for output to the priority encoder 26 if the select bit 52 is a "1" bit. Conversely, the input request vector is selected if the select bit is a "0" bit.

Figures 4, 5:
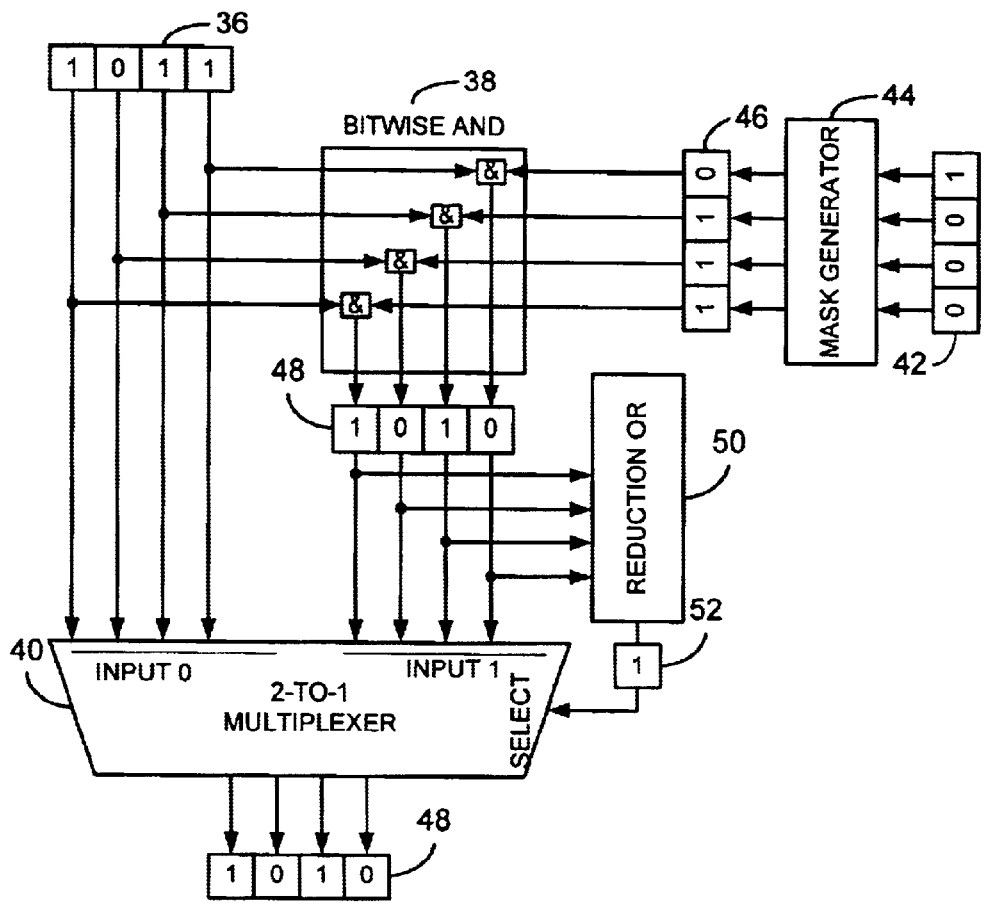
FIG. 4 is an exemplary diagram of processing a 4 bit request vector through the conditional request masking logic shown in FIG. 3; and, FIG. 5 is a truth table for the mask generator for the processing shown in FIG. 4.

Turning now to FIGS. 4 and 5, an exemplary diagram of processing a 4 bit request vector using the implementation of the conditional request masking logic shown in FIG. 3 and a truth table for the mask generator for the example shown in FIG. 5 are shown respectively. FIGS. 4 and 5 are shown only as an example to clarify how the conditional request masking logic is implemented. In the present invention, other implementations can be used, such as multiple single bit requests having each request expressed as a 1 bit or a 32 bit request vector, and it should be understood that these other implementations are within the scope of the present invention.

In this example, the priority structure of the vector runs from the lowest priority on the most left end bit to the highest priority on the most right end bit of the vector. Any predefined priority structures can be implemented with the present invention, which contemplates such implementation. And these other implementations are also with the scope of the present invention.

As shown, a 4 bit request vector 36, specifically "1011", is inputted into the multiplexer 40 and bitwise AND gate 38. Assume, for example, that the most recently serviced vector is a "0001" vector. Since the highest priority request is the end bit that is located right most of the most recently serviced vector, all the remaining bits on the most recently serviced vector are of a lower priority. Consequently, they become a "1" bit according to the implementation described above, and the highest priority request becomes a "0" bit. The request mask vector, therefore, becomes "1110". The truth table 54 of the mask generator 44 for this 4 bit vector priority structure example is shown in FIG. 5.

Next, when the input request vector ("1011") and the request mask vector ("1110") are taken, a masked request vector of "1010" is produced (i.e., 1&1=1, 0&1=0, 1&1=1, and 1&0=0). The algorithm of the bitwise AND gate 38 is that a "1" bit is outputted if the bit from both the input request and the request mask equals a "1" bit; otherwise a "0" bit is outputted. For example, a "1" bit is outputted for the first "1", which is the bit located on the most left end. As explained previously, the masked request vector ("1010") is sent to the multiplexer 40 and the reduction OR gate 50. The reduction OR gate, while taking the masked request vector, outputs a select bit 52 that is a "1" bit if any bit of the masked request is a "1" bit; otherwise, it is a "0" bit. In this case, the masked request vector ("1010") has two "1" bits. As a result, a "1" select bit is outputted to the multiplexer 40, which indicates that the masked request vector, rather than the input request vector, should be outputted to the priority encoder 26. In contrast, if a "0" select bit is sent to the multiplexer 40, the input request 36 will be outputted instead.

FIGS. 3 and 4 show an implementation of the conditional request masking logic 24 to achieve the algorithm of sending only the requests with a lower priority than the most recently serviced request to the priority encoder.

As a result, a barrel shifter and an adder are not needed to shift bits in the input request vector in the present invention. In addition, the present invention can be implemented with fewer gates. Instead of shifting bits in the request vector to obtain the priority, the conditional request masking logic 24 makes it possible that only the requests with lower priority are sent out to the priority encoder 26. Consequently, the priority encoder 26 can select a request to be outputted according to the predefined priority from the vector that is sent from the conditional request masking logic, since all the requests sent to it are eligible for the output.

However, it should be understood that the implementation of the conditional request masking logic can vary greatly, and FIGS. 3 to 4 are meant only as an example. For example, one can implement the conditional request masking logic without a multiplexer, which may change the logic gates depending on the design. One skilled in the art will appreciate the various implementations available for the conditional request masking logic, and these other implementations are within the scope of the present invention.

From the foregoing description, it should be understood that an improved system and method for a round robin arbitration have been shown and described, which have many desirable attributes and advantages. The system, method and circuit provides a round robin arbitration with a shorter propagation delay, while at the same time requiring fewer logic gates. As a result, a more cost effective round robin arbitration circuit can be produced, since it requires fewer hardware devices.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for performing a round robin arbitration, comprising:

an input operable to receive a plurality of requests, wherein said request is designated as a bit;

a conditional request masking logic to selectively send said plurality of requests to a priority encoder and comprising a mask generator to output a request mask of said most recently serviced request stored in said storage element, wherein said request mask is a true bit if it has a lower priority than the most recently serviced request, otherwise said request mask is a false bit;

a priority encoder to output a request from said selected plurality of requests from said conditional request masking logic for servicing;

a storage element to store the most recently serviced request;

a bitwise AND gate that performs an AND operation on an input request and said request mask to output a masked request, wherein said masked request is a true bit if both said input request and said request mask equals a true bit, otherwise said masked request is a false bit; and a multiplexer to select one of said input requests and said masked request;

wherein said conditional request masking logic sends any request from said plurality of requests that has a lower priority according to said priority encoder than the most recently serviced request if such a request exists, otherwise all requests are sent to said priority encoder.

2. The system as defined in claim 1 wherein said plurality of requests can be processed as a single request vector for each cycle.

3. The system as defined in claim 2 wherein said single request vector designates one bit for each request.

4. The system as defined in claim 1 further comprising a reduction OR gate that performs an OR operation on said masked request to output a select bit to said multiplexer, wherein said select bit is a true bit if any bit of said masked request is a true bit, otherwise said select bit is a false bit.

5. The system as defined in claim 4 wherein said multiplexer selects said masked request for output if said select bit is a true bit, otherwise said multiplexer outputs said input request if said select bit is a false bit.

6. A round robin arbitration circuit, comprising:

an input operable to receive a plurality of requests wherein said request is designated as a bit;

a conditional request masking logic to selectively send said plurality of requests to a priority encoder and comprising a mask generator to output a request mask of said most recently serviced request stored in said storage element, wherein said request mask is a true bit if it has a lower priority than the most recently serviced request, otherwise said request mask is a false bit;

a priority encoder to output a request from said selected plurality of requests from said conditional request masking logic for servicing; and, a storage element to store the most recently serviced request;

a bitwise AND gate that performs an AND operation on an input request and said request mask to output a masked request, wherein said masked request is a true bit if both said input request and said request mask equals a true bit, otherwise said masked request is a false bit; and a multiplexer to select one of said input requests and said masked request;

wherein said conditional request masking logic sends any request from said plurality of requests that has a lower priority according to said priority encoder than the most recently serviced request if such a request exists, otherwise all requests are sent to said priority encoder.

* * * * *